United States Patent
Tong et al.

(10) Patent No.: US 8,008,409 B1
(45) Date of Patent: Aug. 30, 2011

(54) ENERGETIC POLY (AZIDOAMINOETHERS)

(75) Inventors: Tat Hung Tong, Bellbrook, OH (US);
David Martin Nickerson, Columbus, OH (US)

(73) Assignee: Cornerstone Research Group, Inc., Dayton, OH (US)

( * ) Notice: Subject to any disclaimer, the term of this patent is extended or adjusted under 35 U.S.C. 154(b) by 129 days.

(21) Appl. No.: 12/573,995

(22) Filed: Oct. 6, 2009

Related U.S. Application Data

(60) Provisional application No. 61/105,582, filed on Oct. 15, 2008.

(51) Int. Cl.
*C08F 283/00* (2006.01)
(52) U.S. Cl. ...................................... 525/523
(58) Field of Classification Search .................. 525/523
See application file for complete search history.

(56) References Cited

U.S. PATENT DOCUMENTS

| | | | |
|---|---|---|---|
| 4,565,884 A * | 1/1986 | Andrulis et al. | 556/137 |
| 4,737,550 A * | 4/1988 | Tomalia | 525/418 |
| 5,288,816 A * | 2/1994 | Inbasekaran et al. | 525/502 |
| 6,783,613 B1 | 8/2004 | Gill et al. | |
| 6,833,037 B1 | 12/2004 | Hallam et al. | |
| 2004/0087760 A1* | 5/2004 | Yumoto et al. | 528/405 |
| 2004/0221953 A1* | 11/2004 | Czaplicki et al. | 156/293 |
| 2008/0108784 A1 | 5/2008 | Golding et al. | |

FOREIGN PATENT DOCUMENTS

WO    PCT/US94/07945    4/1995

OTHER PUBLICATIONS

Zheng Xiaodong, et al.; Synthesis and Properties of Poly-Isocyanate Energetic Curing Agent; Polymer Bulleting, 56, 563-569 (2006).
Detlef Drees, et al.; Synthesis and Characterization of Azido Plasticizer; Propellants, Explosives, Pyrotechnics 24, 159-162 (1999).
Niklas Wingborg, et al.; 2,2 Dinitro-1,3-Bis-Nitrooxy-Propane (NPN): A New Energetic Plasticizer; Propellants, Explosives, Pyrotechnics 27, 314-319 (2002).
Ugo Barbieri, et al.; Low Risk Synthesis of Energetic Poly(3-Azidomethy-3-Methyl Oxetane) from Tosylated Precursors; Propellants, Explosives, Pyrotechnics 31, No. 5, 369-375 (2006).

* cited by examiner

*Primary Examiner* — Mark Eashoo
*Assistant Examiner* — David Karst

(57) ABSTRACT

The currently disclosed device is a novel poly(azidoaminoether)-based energetic polymer utilizing a chemical design that possesses great versatility in tailoring properties such as endothermicity, oxygen balance, flexibility, toughness, and crystallinity. Furthermore, this new chemical design will also be compatible with current polyisocyanate curing chemistry. These attributes will give such novel polymers great potential in meeting the demands of a highly energetic, yet insensitive propellant binder. This material's tailorable mechanical properties and oxygen balance as well as its backwards compatibility with current diisocyanate crosslinking methods make this novel polymer an ideal energetic binder material for use in a variety of munition systems.

1 Claim, 2 Drawing Sheets

ENERGETIC POLY (AZIDOAMINOETHERS)

CROSS REFERENCE TO RELATED APPLICATIONS

This application claims priority from U.S. Provisional Application Ser. No. 61/105,582 filed Oct. 15, 2008.

BACKGROUND OF THE INVENTION

1. Field of the Invention

The present disclosure is a formulation and synthesis of an energetic polymer. The synthesis of this energetic polymer can be altered to modify the mechanical properties, energy content, and oxygen balance of the final energetic polymer.

2. Description of Related Art

Tough, elastomeric polymers such as polybutadiene have long found use as components in composite, solid propellants. These polymers, end-capped with hydroxyl groups, can be crosslinked with diisocyanates such as isophorone diisocyanate (IPDI) to yield a binder material capable of safely accommodating reactive propellant ingredients. This binder provides the mechanical resistance necessary for the active components to withstand stimuli such as impact and heat. If tailored with plasticizers such as DOA (di-octyl adipate), this binding can greatly reduce the sensitivity of highly reactive propellant systems.

Although the mechanically robust polyunsaturated hydrocarbon binders like polybutadiene can effectively provide a matrix component with reduced sensitivity function, their low energy content and minimal combustibility decrease the overall energy density and performance otherwise available to unbound propellant mixtures. For this reason, several "energetic" binder materials have been developed to achieve higher energy densities at equivalent or lower levels of reactive fillers. These materials almost universally seek to achieve higher endothermicity by attaching pendant nitrato and/or azido groups to a polyether backbone. Common energetic binders which utilize pendant azido groups include polyAMMO (poly(3-azidomethyl-3-methyl oxetane), poly-BAMO (poly(3,3-bis-azidomethyl oxetane), and GAP (glycidyl azide polymer). Common energetic binders which utilize pendant nitrate groups include polyNIMMO (poly(3-nitrato-methyl-3-methyloxetane) and polyGLYN (polyglycidyl nitrate).

Many of the solid propellants used in missile and rocket propulsion systems currently in use or development by the Army include an inert polymeric binder matrix composed of urethane crosslinked poly-unsaturated hydrocarbons. By incorporating the propellant solid ingredients (i.e. oxidizers, metal fuels, explosive fillers and ballistic modifiers) within these tough and flexible binder matrices, otherwise sensitive munitions can be made insensitive, or at least less sensitive, to mechanical stimuli such as friction, impact, and electrostatic discharge.

These polybutadiene and urethane derived binding networks lack the stored chemical energy characteristic of the high-energy compounds necessary for a munition's functionality. This lack of energy contributes to an overall decrease in the energy content and density impulse of the final energetic material system. Ideally, a polymeric binder should be developed that has a higher energetic functionality and density than polybutadiene, yet remains inert, tough, flexible, and safe during all conditions except desired ignition. During desired ignition, the binder matrix's energy content should contribute significantly to the total energy production of the propulsion system. In this way, a reduction of hazardous high energy filler loading would be possible while maintaining the same level of propellant performance. Alternatively, for any given level of filler, a greater performance would be achieved substituting an energetic binder for a non-energetic binder.

Approaches currently used to synthesize other energetic polymers employ chemistry that cannot easily tailor the transition temperature ($T_g$), mechanical properties, oxygen balance, or energetic content of the resulting polymers. As such, common energetic polymers must utilize additives such as plasticizers to achieve the right balance of $T_g$ and mechanical properties, while their oxygen balance and energetic content remain fixed. For example, GAP-based propellants do not exhibit good mechanical properties, suffering especially from poor low temperature properties. This drawback has to be managed by heavy loading of plasticizers or by blending with flexible linear-structural polymers such as PEG and PCL.

This excessive plasticization is not desirable due to possible side effects such as reduced shelf life/reliability resulting from plasticizer migration or a reduced energy density stemming from the large volume of unreactive plasticizer. This reduction in energy density can be minimized by using various energetic plasticizers; however, the issue involving plasticizer migration and shelf life remains. Current research to sidestep the necessity for energetic binder plasticization involves copolymerizing various energetic polymers in a way that creates a thermoplastic elastomer binder with augmented mechanical properties. So far, this approach has met with some success; however, plasticizers still must be used to achieve the low-temperature properties necessary for a successful energetic binder.

SUMMARY OF THE INVENTION

The currently disclosed device is a novel poly(azidoaminoether)-based energetic polymer utilizing a chemical design that possesses great versatility in tailoring properties such as endothermicity, oxygen balance, flexibility, toughness, and crystallinity. Furthermore, this new chemical design will also be compatible with current polyisocyanate curing chemistry. These attributes will give such novel polymers great potential in meeting the demands of a highly energetic, yet insensitive propellant binder. This material's tailorable mechanical properties and oxygen balance as well as its backwards compatibility with current diisocyanate crosslinking methods make this novel polymer an ideal energetic binder material for use in a variety of munition systems.

DETAILED DESCRIPTION OF EXEMPLARY EMBODIMENTS

Figure 1:
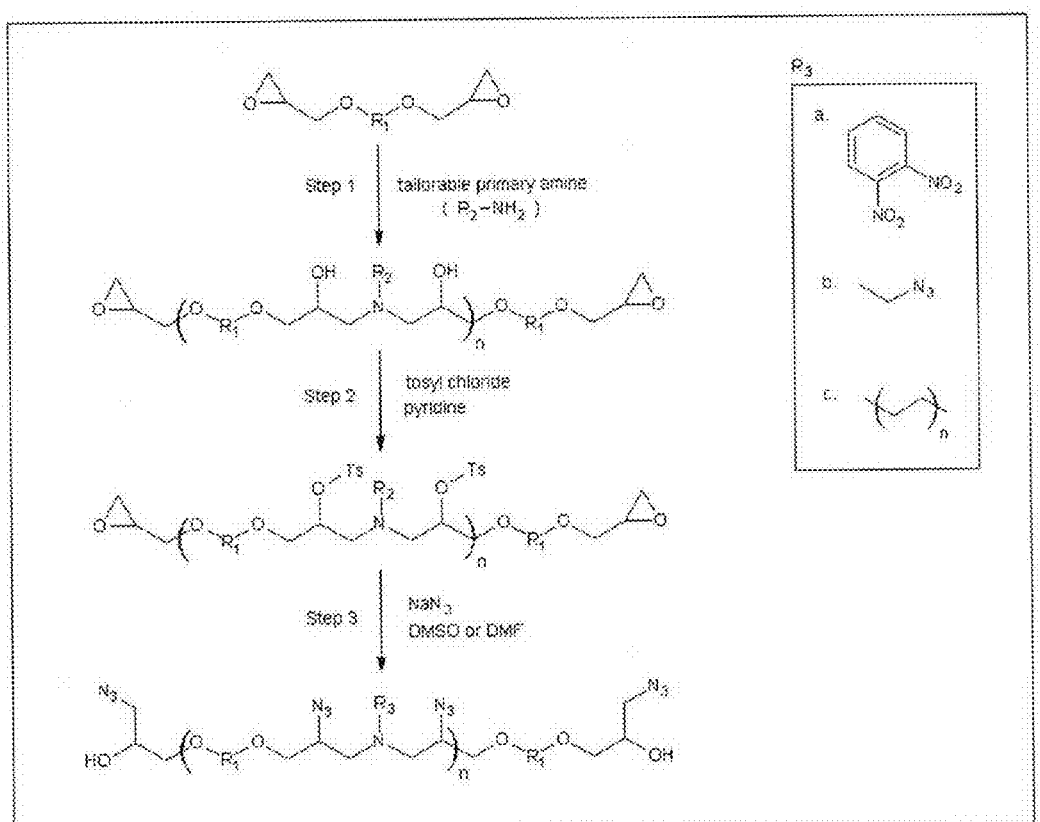
FIG. 1 shows a synthetic scheme for a possible poly(azidoaminoether) wherein $R_1$ is an alkyl group. $R_2$ is a (a) dinitrobenzene functionalized, (b) azidoethyl functionalized, or (c) aliphatic group
Figure 2:
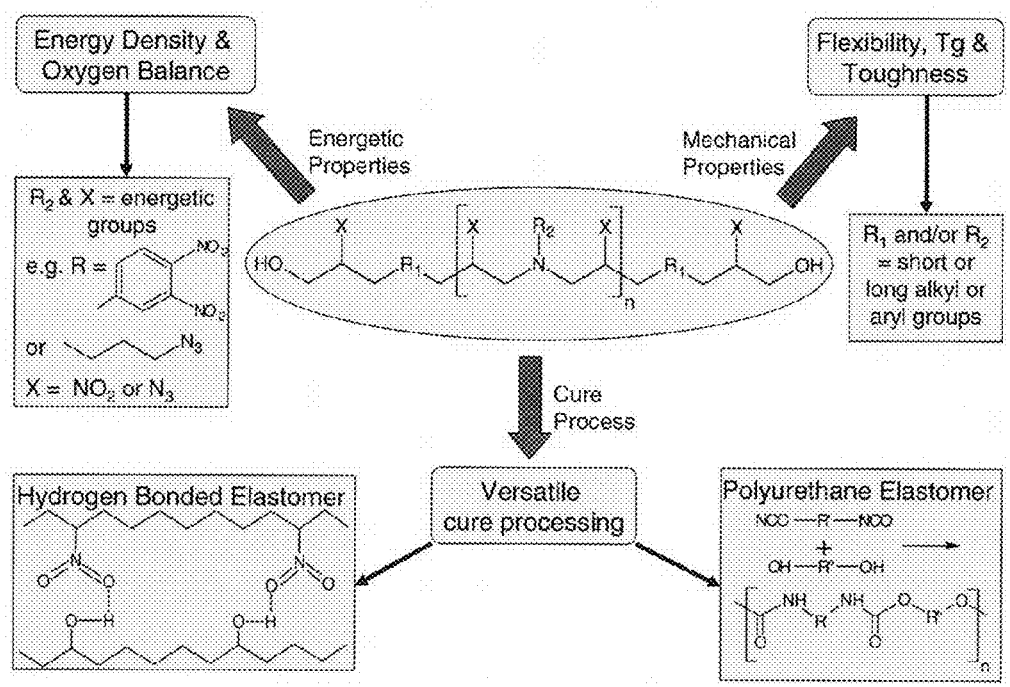
FIG. 2 shows chemical approaches to tailor various desirable properties for the energetic polymer.

A synthetic scheme of the currently disclosed polymer system is shown in FIG. 1. This system is highly tailorable as seen in the three "R" groups shown in the synthetic scheme. Any R group substitutions would be considered alternative components. Potential components with specific R-groups are commercially available for all steps of this synthesis scheme.

The currently disclosed polymers can be generated by converting a difunctional epoxy starting material into a poly (azidoaminoether) in a controlled and safe manner. In the first step of the synthesis, as shown in FIG. 1, the initial epoxy compound's R2 group can be effectively tailored to give the final product a desired transition temperature ($T_g$) and mechanical properties. Suitable R1 amines include dinitrobenzamine, ethanolamine, and various aliphatic amines. By using nitro-substituted R2 groups (e.g. dinitrobenzamine) the final oxygen balance and energy content in the energetic binder can be increased. By using azido functionalized R2 groups (via ethanolamine starting material), the final gaseous decomposition content and energy content can be increased. And, by using aliphatic amines, the mechanical properties and $T_g$ of the poly(azidoaminoether) can be tailored. By combining various ratios of nitro-substituted amines, hydroxy functionalized amines, and aliphatic amines, a poly(azidoaminoether) can be synthesized with a controlled energy content and oxygen balance as well as tailored mechanical properties. Table 1 lists the effects of the R2 groups on various properties.

TABLE 1

| $R_2$ group | Effect on final energetic binder |
| --- | --- |
| nitrate | increased oxygen balance and energy content |
| hydroxyl | increased azide percent and energy content |
| aliphatic | decreased $T_g$ and increased toughness after crosslinking |

In the second step of this synthesis, tosylation of the hydroxyl pendants of the resultant polyaminoether from step one is performed. In this step, a slight excess of the epoxy oligomer created in step one will be used to insure that oxirane (epoxy) groups terminate the oligomer chains. These oxirane end groups are necessary for conversion to hydroxy end groups in the final step of the synthesis. A tosylation of similar oligomers in pyridine as a precursor for azidization has been previously demonstrated.

The final step of the synthesis accomplishes two things at once. First, azidization will be performed on the tosylated oligomer through a classic SN2 reaction between the azide anion (N3⁻) and the pendant tosyl group. This reaction can be very fast in dipolar aprotic solvents such as DMF resulting in an easily precipitated, high yield product. Second, the catalyst-free ring opening of the oligomer's terminating epoxy groups by the azide anion results in a hydroxyl-terminated poly(azidoaminoether).

The currently disclosed system has the potential to overcome many of the disadvantages discussed earlier by generating a highly energetic hydroxyl terminated polymer with a highly adaptable chemical synthesis allowing for the easy adjustability of $T_g$, mechanical properties, oxygen balance, and energy content for use as a binder in propellant systems. This high-energy, tailorable polymer can potentially achieve a tough, flexible, high-energy matrix with excellent low-temperature performance ($T_g$<-60 F) without the addition of plasticizers.

Another benefit of the currently presented three-step synthesis approach is the avoidance of potential dangers and complications inherently found in previously known two-step azidization schemes which involve azidizing a liquid monomer through nucleophilic displacement of a suitable leaving group and the subsequent polymerization of such monomers. These previously known two-step approaches lead to critical steps where handling and manipulating the unstable and highly energetic monomer can prove dangerous, especially when the synthesis is scaled up from lab to production scale. The currently disclosed three-step method allows azidation to occur safely by reacting an azide anion with a less reactive tosylated oligomer rather than the unstable monomer. Table 2 shows the weight percent (per repeating unit) of azide, nitrato, and oxygen in various energetic oligomers.

TABLE 2

| | % $N_3$ (azide) | % $NO_2$ (nitrate) | % Oxygen |
| --- | --- | --- | --- |
| Glycidyl azide polymer (GAP) | 42.4% | 0.0% | 16.0% |
| poly(3-nitrato-methyl-3-methyloxetane) (polyNIMMO) | 0.0% | 31.5% | 43.8% |
| poly(Azidoaminoether) using Hydroxyl $R_2$ group | 47.0% | 0.0% | 11.9% |
| poly(Azidoaminoether) using Nitrated $R_2$ group | 22.2% | 24.3% | 25.3% |
| poly(Azidoaminoether) using both Hydroxyl and Nitrated $R_2$ groups | 40.8% | 6.1% | 15.3% |

The purity of the synthesized intermediates and poly(azidoaminoether) oligomers should be assessed using Gel Permeation Chromatography (GPC). The chemical identities of these products will be confirmed by standard chemical analysis such as Fourier Transform Infrared Spectroscopy (FTIR) and Nuclear Magnetic Resonance (NMR) spectroscopy. If the resultant poly(azidoaminoether) oligomers require further purification, separation via conventional wet chemistry techniques, such as precipitation, column chromatography, or other similar techniques can be utilized.

The desired oligomers are crosslinked using a diisocyanate or similar curing agent to form a large, polymeric end product weighing ten (10) grams or more. If further tailoring of oxygen balance and energy content is required, an energetic diisocyanate cure agent may be utilized to increase these properties. Depending on the mechanical properties and $T_g$ of the final crosslinked polymer, plasticization may be required. If required, the amount of plasticization is expected to be low in comparison with the heavily plasticized energetic binders formed from GAP or polyNIMMO. Due to the similar chemical structures of poly(azidoaminoether) and GAP, plasticizers used in the processing of GAP should also be effective in the processing of poly(azidoaminoethers).

What is claimed is:
1. A method of making an energetic polymer comprising:
   a difunctional epoxy is reacted with a tailorable primary amine producing a polyaminoether;
   tosylation of hydroxyl pendants of the resultant polyaminoether is accomplished by reacting a slight excess of the polyaminoether to insure that oxirane (epoxy) groups terminate the polyaminoether thereby producing a tosylated oligomer; and
   azidization is performed on the tosylated oligomer through a classic SN2 reaction between an azide anion ($N_3^-$) and a pendant tosyl group of the tosylated oligomer and a catalyst-free ring opening of the oligomer's terminating epoxy groups by the azide anion results in a hydroxyl-terminated poly(azidoaminoether).

* * * * *